United States Patent
Liu (10) Patent No.: US 9,226,176 B2
(45) Date of Patent: Dec. 29, 2015

(54) TRANSMITTING AND RECEIVING METHOD AND DEVICE

(71) Applicant: Huawei Technologies Co., Ltd., Shenzhen, Guangdong (CN)

(72) Inventor: Yi Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 14/096,454

(22) Filed: Dec. 4, 2013

(65) Prior Publication Data

US 2014/0092777 A1    Apr. 3, 2014

Related U.S. Application Data

(63) Continuation of application No. PCT/CN2011/075801, filed on Jun. 16, 2011.

(51) Int. Cl.
*H04W 24/02* (2009.01)
*H04W 48/16* (2009.01)
*H04W 84/04* (2009.01)

(52) U.S. Cl.
CPC .............. *H04W 24/02* (2013.01); *H04W 48/16* (2013.01); *H04W 84/045* (2013.01)

(58) Field of Classification Search
CPC .... H04W 24/02; H04W 48/16; H04W 84/045
USPC ......... 370/254, 310, 312, 328, 338, 351, 389, 370/392
See application file for complete search history.

(56) References Cited

U.S. PATENT DOCUMENTS

| | | | |
|---|---|---|---|
| 2009/0247159 A1 | 10/2009 | Flore et al. | |
| 2009/0316652 A1* | 12/2009 | Agashe et al. | 370/331 |
| 2010/0008293 A1 | 1/2010 | Gupta et al. | |
| 2010/0039991 A1* | 2/2010 | Godin et al. | 370/328 |
| 2010/0074129 A1 | 3/2010 | Wang et al. | |
| 2010/0279601 A1* | 11/2010 | Phan et al. | 455/7 |

(Continued)

FOREIGN PATENT DOCUMENTS

| | | |
|---|---|---|
| CN | 101729115 A | 6/2010 |
| CN | 101801049 A | 8/2010 |

(Continued)

OTHER PUBLICATIONS

"Open mode HeNB Problem," 3GPP TSG-RAN3 Meeting #65, Shenzhen, P. R. China, R3-091685, 3$^{rd}$ Generation Partnership Project, Valbonne, France (Aug. 24-28, 2009).

(Continued)

*Primary Examiner* — Obaidul Huq
(74) *Attorney, Agent, or Firm* — Leydig, Voit & Mayer, Ltd.

(57) ABSTRACT

A transmitting and a receiving method and a device are provided in the present invention. The method includes: determining, by a terminal, a base station type of a base station controlling a neighboring cell of a serving cell; and transmitting, by the terminal, information indicating the base station type to a network device, so that the network device determines the base station type according to the information indicating the base station type. According to embodiments of the present invention, the accurate recognition of the base station type is realized.

17 Claims, 4 Drawing Sheets

--- determining, by a terminal, a base station type of a base station controlling a first cell — 41 transmitting, by the terminal, the base station identity to a network device, wherein the base station identity is carried in a cell global identity, and wherein, bits of the cell global identity occupied by the base station identity corresponding to a base station type of the base station controlling the first cell are the same as bits of a cell global identity occupied by a base station identity corresponding to a base station type of a base station controlling a second cell, the base station type of the base station controlling the second cell is different from the base station type of the base station controlling the first cell, and both the first cell and the second cell are neighboring cells of a serving cell of the terminal — 42

(56) References Cited

U.S. PATENT DOCUMENTS

| | | | |
|---|---|---|---|
| 2011/0007690 A1 | 1/2011 | Chang et al. | |
| 2011/0026486 A1* | 2/2011 | Hapsari et al. | 370/331 |
| 2011/0310791 A1* | 12/2011 | Prakash et al. | 370/315 |
| 2012/0020334 A1 | 1/2012 | Yu et al. | |

FOREIGN PATENT DOCUMENTS

| | | |
|---|---|---|
| CN | 101998352 A | 3/2011 |
| CN | 102026167 A | 4/2011 |
| CN | 102037765 A | 4/2011 |
| JP | 2011097543 A | 5/2011 |

OTHER PUBLICATIONS

"Routing of inbound handover," 3GPP TSG-RAN WG3 Meeting #63bis, Seoul, Korea, R3-090859, 3$^{rd}$ Generation Partnership Project, Valbonne, France (Mar. 23-26, 2009).

"3GPP TS 36.331—3$^{rd}$ Generation Partnership Project; Technical Specification Group Radio Access Network; Evolved Universal Terrestrial Radio Access (E-UTRA) Radio Resource Control (RRC); Protocol specification (Release 8)," Version 8.3.0, 3$^{rd}$ Generation Partnership Project, Valbonne, France (Sep. 2008).

"3GPP TS 36.413—3$^{rd}$ Generation Partnership Project; Technical Specification Group Radio Access Network; Evolved Universal Terrestrial Radio Access Network (E-UTRAN); S1 Application Protocol (S1AP) (Release 8)," Version 8.3.0, 3$^{rd}$ Generation Partnership Project, Valbonne, France (Sep. 2008).

"3GPP TS 36.423—3$^{rd}$ Generation Partnership Project; Technical Specification Group Radio Access Network; Evolved Universal Terrestrial Radio Access Network (E-UTRAN); X2 application protocol (X2AP) (Release 8)," Version 8.3.0, 3$^{rd}$ Generation Partnership Project, Valbonne, France (Sep. 2008).

"Inbound Mobility to HeNB open cells and macro CSG cells," Document R3-102282, Agenda Item 12.3.3, 3GPP TSG-RAN WG3 #69, Madrid, Spain, 3$^{rd}$ Generation Partnership Project, Valbonne, France (Aug. 2010).

"Solutions to HeNB addressing issue," 3GPP TSG-RAN WG3, Meeting #69bis, Xi'an, China, R3-102611, 3rd Generation Partnership Project, Valbonne, France (Oct. 11-15, 2010).

* cited by examiner

FIG. 10

TRANSMITTING AND RECEIVING METHOD AND DEVICE

CROSS REFERENCE TO RELATED APPLICATIONS

This application is a continuation of International Patent Application No. PCT/CN2011/075801, filed on Jun. 16, 2011, which is hereby incorporated by reference in its entirety.

TECHNICAL FIELD

The present invention relates to mobile communication technologies and, in particular, to a transmitting and a receiving method and a device.

BACKGROUND

Characteristics of a self-organization network (Self-Organization Network, SON) include an automatic neighbor relation (Automatic Neighbor Relation, ANR) function. According to the ANR function, automatic discovery of unknown cells and switching problem between cells with conflict physical cell identity (Physical Cell Identity, PCI) are realized, mainly through reporting, by a user equipment, (User Equipment, UE) a cell global identity (Cell Global Identity, CGI) after reading a system message of a neighbor cell. Reporting an eNB identity (eNB ID) by the UE is required in both an ANR switching and solving the PCI conflict.

Taking the ANR switching in a long term evolution (Long Term Evolution, LTE) system as an example, the cell global identity is an evolved universal terrestrial radio access network cell global identity (Evolved Universal Terrestrial Radio Access Network CGI, ECGI). In this case, the UE reports the ECGI to the network side, where the ECGI includes the eNB ID.

Currently, the LTE defines base stations (eNodeBs, eNBs) in two types: macro (macro) base station and home (Home) base station, where, an eNB ID of a macro base station occupies first 20 bits (bit) of an ECGI while last 8 bits of the ECGI serve as cell ID (Cell ID); an eNB ID of a home base station occupies integral 28 bits of an ECGI.

In current solutions, a base station controlling a neighbor cell which has been newly discovered during the ANR is treated as a macro base station as default. However, it is possible that the base station controlling a newly discovered neighbor cell is a home base station. In this case, if such base station is treated as the macro base station, an error regarding the identification of the eNB ID occurs undoubtedly. Therefore, this manner can not ensure that the base station type is identified accurately or the base station identification is acquired accurately.

SUMMARY

The present invention provides a transmitting and receiving method and a device, according to which the base station type or the base station identity can be identified accurately.

A first aspect of the present invention provides a transmitting method, including:

determining, by a terminal, a base station type of a base station controlling a neighboring cell of a serving cell;

transmitting, by the terminal, information indicating the base station type to a network device, so that the network device determines the base station type according to the information indicating the base station type.

In a first implementation of the first aspect of the present invention, the information indicating the base station type is a PCI, and the transmitting, by the terminal, the information indicating the base station type to the network device includes:

transmitting, by the terminal, a PCI of the neighboring cell to the network device; wherein, the PCI is allocated to the neighboring cell by the terminal, and belongs to a PCI group corresponding to the base station type of the base station controlling the neighboring cell, and does not belong to at least one PCI group not corresponding to the base station type of the base station controlling the neighboring cell.

In a second implementation of the first aspect of the present invention, after the determining, by the terminal, the base station type of the base station controlling the neighboring cell of the serving cell, and before the transmitting, by the terminal, the PCI of the neighboring cell to the network device, the method further includes:

selecting, by the terminal, a PCI from the PCI group corresponding to the base station type of the base station controlling the neighboring cell, and allocating the PCI to the neighboring cell.

In a third implementation of the first aspect of the present invention, the base station type of the base station controlling the neighboring cell is a macro base station, and at least one base station type does not correspond to the base station controlling the neighboring cell is a home base station; or, the base station type of the base station controlling the neighboring cell is a home base station, and at least one base station type does not correspond to the base station controlling the neighboring cell is a macro base station.

In a fourth implementation of the first aspect of the present invention, when the base station type of the base station controlling the neighboring cell is the macro base station, the PCI is any value from 0 to 412; when the base station type of the base station controlling the neighboring cell is the home base station, the PCI is any value from 413 to 511.

In a fifth implementation of the first aspect of the present invention, the information indicating the base station type is a base station type carried in a cell global identity, and the transmitting, by the terminal, the information indicating the base station type to the network device includes:

transmitting, by the terminal, a cell global identity of the neighboring cell to the network device, wherein the cell global identity carries the base station type of the neighboring cell.

In a sixth implementation of the first aspect of the present invention, the cell global identity occupies 32 bits, the base station type occupies first 4 bits of the cell global identity.

In a seventh implementation of the first aspect of the present invention, the cell global identity also carries a base station identity of the neighboring cell; when the base station type of the base station controlling the neighboring cell to is the macro base station, the base station identity occupies first 20 bits following the base station type of the cell global identity; when the base station type of the base station controlling the neighboring cell is the home base station, the base station identity occupies first 28 bits following the base station type of the cell global identity.

In an eighth implementation of the first aspect of the present invention, the neighboring cell of the serving cell includes: a neighboring cell of the serving cell discovered during an automatic neighbor relation detection.

A second aspect of the present invention provides a receiving method, including:

receiving, by a network device, information indicating a base station type of a base station controlling a first cell transmitted by a terminal, wherein the first cell is a neighboring cell of a serving cell of the terminal;

determining, by the network device, the base station type of the first cell according to the information indicating the base station type of the base station controlling the first cell.

In a first implementation of the second aspect of the present invention, the information indicating the base station type of the base station controlling the first cell is a PCI, and the PCI belongs to a PCI group corresponding to the base station type of the base station controlling the first cell, and the determining, by the network device, the base station type of the first cell according to the information indicating the base station type of the base station controlling the first cell includes:

determining, by the network device, the base station type of the base station controlling the first cell according to the PCI group to which the PCI belongs.

In a second implementation of the second aspect of the present invention, a PCI in a PCI group corresponding to a macro base station ranges from 0 to 412, and the determining, by the network device, the base station type of the base station controlling the first cell according to the PCI group to which the PCI belongs includes: if the PCI is within the range of 0~412, determining, by the network device, that the base station type of the base station controlling the first cell is the macro base station; or, a PCI in a PCI group corresponding to a home base station ranges from 413 to 511, and the determining, by the network device, the base station type of the base station controlling the first cell according to the PCI group to which the PCI belongs includes: if the PCI is within the range of 413~511, determining, by the network device, that the base station type of the base station controlling the first cell is the home base station.

In a third implementation of the second aspect of the present invention, the information indicating the base station type of the base station controlling the first cell is a base station type carried in a cell global identity.

In a fourth implementation of the second aspect of the present invention, the cell global identity occupies 32 bits, and the base station type occupies first 4 bits of the cell global identity.

In a fifth implementation of the second aspect of the present invention, after determining the base station type of the first cell, further including, acquiring, by the network device, a base station identity of the base station controlling the first cell from a received cell global identity of the first cell according to the base station type.

In a sixth implementation of the second aspect of the present invention, the acquiring, by the network device, the base station identity of the base station controlling the first cell from the received cell global identity of the first cell according to the base station type includes:

receiving, by the network device, the cell global identity of the first cell transmitted by the terminal, wherein the cell global identity carries the base station identity; and when the base station type of the base station controlling the first cell is a macro base station, reading, by the network device, first 20 bits of the received cell global identity, wherein the first 20 bits are the base station identity of the base station controlling the first cell; or, when the base station type of the base station controlling the first cell is a home base station, reading, by the network device, first 28 bits of the received cell global identity of the cell, wherein the first 28 bits are the base station identity of the base station controlling the first cell.

In a seventh implementation of the second aspect of the present invention, after determining the base station type of the first cell, further including, acquiring, by the network device, a base station identity of the base station controlling the first cell from a received cell global identity of the first cell according to the base station type.

In an eighth implementation of the second aspect of the present invention, the receiving, by the network device, the information indicating the base station type of the base station controlling the first cell transmitted by the terminal, includes: receiving, by the network device, the cell global identity of the first cell transmitted by the terminal, wherein the cell global identity carries the base station type and the base station identity; and the acquiring, by the network device, a base station identity of the base station controlling the first cell from a received cell global identity of the first cell according to the base station type, includes:

when the base station type of the base station controlling the first cell is a macro base station, reading, by the network device, first 20 bits following the base station type of the received cell global identity, wherein the first 20 bits following the base station type are the base station identity of the base station controlling the first cell; or, when the base station type of the base station controlling the first cell is a home base station, reading, by the network device, first 28 bits following the base station type of the received cell global identity, wherein the first 28 bits following the base station type are the base station identity of the base station controlling the first cell.

A third aspect of the present invention provides a transmitting method, including:

determining, by a terminal, a base station identity of a base station controlling a first cell;

transmitting, by the terminal, the base station identity to a network device, where the base station identity is carried in a cell global identity, and where, bits of the cell global identity occupied by the base station identity corresponding to a base station type of the base station controlling the first cell are the same as bits of a cell global identity occupied by a base station identity corresponding to a base station type of a base station controlling a second cell, the base station type of the base station controlling the second cell is different from the base station type of the base station controlling the first cell, and both the first cell and the second cell are neighboring cells of a serving cell of the terminal.

In a first implementation of the third aspect of the present invention, the bits refer to first 20 bits.

In a second implementation of the third aspect of the present invention, when the base station type is a home base station, last 8 bits of the cell global identity are all 1.

A fourth aspect of the present invention provides a receiving method, including:

receiving, by a network device, a cell global identity transmitted by a terminal, where the cell global identity carries a base station identity of a base station controlling a first cell, and the first cell is a neighboring cell of a serving cell of the terminal;

reading, by the network device, bits of predetermined length from the cell global identity, and determining the read bits as the base station identity of the base station controlling the first cell.

In a first implementation of the fourth aspect of the present invention, the reading, by the network device, bits of predetermined length from the cell global identity, and determining the read bits as the base station identity of the base station controlling the first cell, includes:

when the base station controlling the first cell is a macro base station or a home base station, reading, by the network device, first 20 bits of the cell global identity, and determining the first 20 bits as the base station identity of the base station controlling the first cell.

A fifth aspect of the present invention provides a transmitting device, including:

a processor, configured to determine a base station type of a base station controlling a neighboring cell of a serving cell;

a transmitter, configured to transmit information indicating the base station type determined by the processor to a network device, so that the network device determines the base station type according to the information indicating the base station type determined by the processor.

In a first implementation of the fifth aspect of the present invention, the information indicating the base station type is PCI, the transmitter is specifically configured to: transmit a PCI of the neighboring cell to the network device; wherein, the PCI is allocated to the neighboring cell by the terminal, and belongs to a PCI group corresponding to the base station type of the base station controlling the neighboring cell, and does not belong to at least one PCI group not corresponding to the base station type of the base station controlling the neighboring cell.

In a second implementation of the fifth aspect of the present invention, further including:

a selector, configured to select a PCI from the PCI group corresponding to the base station type of the base station controlling the neighboring cell, and allocate the PCI to the neighboring cell;

the transmitter is specifically configured to transmit the PCI allocated by the selector to the network device.

In a third implementation of the fifth aspect of the present invention, the base station type of the base station controlling the neighboring cell determined by the processor is a macro base station, and at least one base station type does not correspond to the base station controlling the neighboring cell is a home base station; or, the base station type of the base station controlling the neighboring cell is a home base station, and at least one base station type does not correspond to the base station controlling the neighboring cell is a macro base station.

In a fourth implementation of the fifth aspect of the present invention, when the base station type of the base station controlling the neighboring cell determined by the processor is the macro base station, the PCI selected by the selector is any value from 0 to 412; when the base station type of the base station controlling the neighboring cell determined by the processor is the home base station, the PCI selected by the selector is any value from 413 to 511.

In a fifth implementation of the fifth aspect of the present invention, the information indicating the base station type is a base station type carried in a cell global identity, and the transmitter is specifically configured to: transmit a cell global identity of the neighboring cell to the network device, wherein the cell global identity carries the base station type of the neighboring cell.

In a sixth implementation of the fifth aspect of the present invention, the cell global identity transmitted by the transmitter occupies 32 bits, the base station type occupies first 4 bits of the cell global identity.

In a seventh implementation of the fifth aspect of the present invention, the cell global identity transmitted by the transmitter also carries a base station identity of the neighboring cell;

when the base station type of the base station controlling the neighboring cell determined by the processor is the macro base station, the base station identity transmitted by the transmitter occupies first 20 bits following the base station type of the cell global identity;

when the base station type of the base station controlling the neighboring cell determined by the process is the home base station, the base station identity transmitted by the transmitter occupies first 28 bits following the base station type of the cell global identity.

In an eighth implementation of the fifth aspect of the present invention, the processor is further configured to take a neighboring cell of a serving cell discovered during an automatic neighbor relation detection as the neighboring cell of the serving cell.

A sixth aspect of the present invention provides a receiving device, including:

a receiver, configured to receive information indicating a base station type of a base station controlling a first cell transmitted by a terminal, where the first cell is a neighboring cell of a serving cell of the terminal;

a processor, configured to determine the base station type of the first cell according to the information indicating the base station type of the base station controlling the first cell received by the receiver.

In a first implementation of the sixth aspect of the present invention, the information indicating the base station type of the base station controlling the first cell is a PCI, and the PCI belongs to a PCI group corresponding to the base station type of the base station controlling the first cell, the processor is specifically configured to: determine the base station type of the base station controlling the first cell according to the PCI group to which the PCI belongs.

In a second implementation of the sixth aspect of the present invention, a PCI in a PCI group corresponding to a macro base station ranges from 0 to 412, and the processor is specifically configured to: if the PCI is within the range of 0~412, determine that the base station type of the base station controlling the first cell is the macro base station; or, a PCI in a PCI group corresponding to a home base station ranges from 413~511, and the processor is specifically configured to: if the PCI is within the range of 413~511, determine that the base station type of the base station controlling the first cell is the home base station.

In a third implementation of the sixth aspect of the present invention, the information indicating the base station type of the base station controlling the first cell received by the receiver is a base station type carried in a cell global identity.

In a fourth implementation of the sixth aspect of the present invention, the cell global identity received by the receiver occupies 32 bits, and the base station type occupies first 4 bits of the cell global identity.

In a fifth implementation of the sixth aspect of the present invention, further including:

a first recognizer, configured to acquire a base station identity of the base station controlling the first cell from a received cell global identity of the first cell according to the base station type.

In a sixth implementation of the sixth aspect of the present invention, the first recognizer is specifically configured to:

receive the cell global identity of the first cell transmitted by the terminal, wherein the cell global identity carries the base station identity; and when the base station type of the base station controlling the first cell is a macro base station, read first 20 bits of the received cell global identity, wherein the first 20 bits are the base station identity of the base station controlling the first cell; or, when the base station type of the base station controlling the first cell is a home base station, read first 28 bits of the received cell global identity of the cell, wherein the first 28 bits are the base station identity of the base station controlling the first cell.

In a seventh implementation of the sixth aspect of the present invention, further including, a second recognizer, configured to acquire a base station identity of the base station controlling the first cell from a received cell global identity of the first cell according to the base station type.

In an eighth implementation of the sixth aspect of the present invention, the receiver is specifically configured to: receive the cell global identity of the first cell transmitted by the terminal, wherein the cell global identity carries the base station type and the base station identity;

the second recognizer is specifically configured to: when the base station type of the base station controlling the first cell is a macro base station, read first 20 bits following the base station type of the received cell global identity, wherein the first 20 bits following the base station type are the base station identity of the base station controlling the first cell; or, when the base station type of the base station controlling the first cell is a home base station, read first 28 bits following the base station type of the received cell global identity, wherein the first 28 bits following the base station type are the base station identity of the base station controlling the first cell.

A seventh aspect of the present invention provides a transmitting device, including:

a processor, configured to determine a base station identity of a base station controlling a first cell;

a transmitter, configured to transmit the base station identity to a network device, where the base station identity is carried in a cell global identity, and where, bits of the cell global identity occupied by the base station identity corresponding to a base station type of the base station controlling the first cell are the same as bits of a cell global identity occupied by the base station identity corresponding to a base station type of a base station controlling a second cell is different from the base station type of the base station controlling the first cell, and both the first cell and the second cell are neighboring cells of a serving cell of the terminal.

In a first implementation of the seventh aspect of the present invention, the base station identity occupies first 20 bits of the cell global identity transmitted by the transmitter.

In a second implementation of the seventh aspect of the present invention, when the base station type is a home base station, last 8 bits of the cell global identity transmitted by the transmitter are all 1.

An eighth aspect of the present invention provides a receiving device, including:

a receiver, configured to receive a cell global identity transmitted by a terminal, where the cell global identity carries a base station identity of a base station controlling a first cell, and the first cell is a neighboring cell of a serving cell of the terminal;

a processor, configured to read bits of predetermined length from the cell global identity, and determine the read bits as the base station identity of the base station controlling the first cell.

In a first implementation of the eighth aspect of the present invention, the processor is specifically configured to: when the base station controlling the first cell is a macro base station or a home base station, read first 20 bits of the cell global identity, and determining the first 20 bits as the base station identity of the base station controlling the first cell.

According to embodiments of the present invention, the terminal transmits information indicating the base station type to the network device, therefore, the network side is enabled to determine the base station type and, thus, the accurate recognization of the base station type is realized; or, the terminal transmits the base station type to the network device, where different base station types occupy the same bits of the base station identity, therefore, the accurate recognization of the base station type is realized.

BRIEF DESCRIPTION OF DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

DESCRIPTION OF EMBODIMENTS

In order to make the objectives, technical solutions, and advantages of embodiments of the present invention more clearly, the technical solutions in embodiments of the present invention are hereinafter described clearly and completely with reference to the accompanying drawings in embodiments of the present invention. Obviously, the described embodiments are only a part of embodiments of the present invention, rather than all embodiments of the present invention. All other embodiments obtained by persons of ordinary skill in the art based on embodiments of the present invention without any creative efforts shall fall within the protection scope of the present invention.

Figure 1:
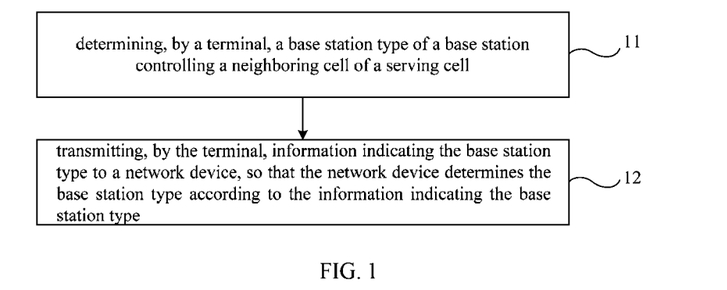
FIG. 1 is a schematic flow chart of a transmitting method according to an embodiment of the present invention.

FIG. 1 is a schematic flow chart of a transmitting method according to an embodiment of the present invention. The transmitting method includes:

Step 11: determining, by a terminal, a base station type of a base station controlling a neighboring cell of a serving cell;

Where, the neighboring cell of the serving cell may be a neighboring cell of the serving cell discovered during an automatic neighbor relation detecting. For example, in a SON network, a UE may detect other neighboring cells excluded from the neighboring cell list through the ANR process, that is, the neighboring cell automatically discovered is detected. The UE may report the base station identity of the neighboring cell automatically discovered to a network side. At this time, the above neighboring cell of the serving cell may be the neighboring cell automatically discovered in particular.

The base station type corresponding to the neighboring cell of the serving cell may be a macro base station, or may be a home base station. It can be determined that whether the neighboring cell of the serving cell is a macro base station or a home base station through an automatic neighbor relation detection.

Step 12: transmitting, by the terminal, information indicating the base station type to a network device, so that the network device determines the base station type according to the information indicating the base station type.

For example, the information indicating the base station type is a PCI, and the terminal transmits the PCI of the neighboring cell to the network device; where, the PCI is allocated to the neighboring cell by the terminal, and belongs to a PCI group corresponding to the base station type of the base station controlling the neighboring cell, and does not belong to at least one PCI group not corresponding to the base station type of the base station controlling the neighbor cell.

For another example, the information indicating the base station type is a base station type carried in a cell global identity, and the terminal transmits a cell global identity of the neighboring cell to the network device, where the cell global identity carries the base station type of the neighboring cell.

According to this embodiment of the present invention, the terminal transmits information indicating the base station type to the network device, therefore, the network side is enabled to determine the base station type and, thus, the accurate recognition of the base station type is realized.

Figure 2:
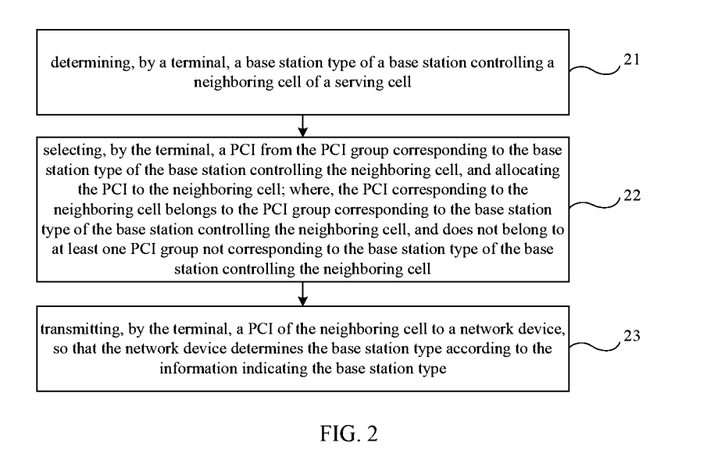
FIG. 2 is a schematic flow chart of a transmitting method according to another embodiment of the present invention.

FIG. 2 is a schematic flow chart of a transmitting method according to another embodiment of the present invention. The method includes:

Step 21: determining, by a terminal, a base station type of a base station controlling a neighboring cell of a serving cell;

For example, reference may be made to the description about Step 11.

Step 22: selecting, by the terminal, a PCI from the PCI group corresponding to the base station type of the base station controlling the neighboring cell, and allocating the PCI to the neighboring cell; where, the PCI corresponding to the neighboring cell belongs to the PCI group corresponding to the base station type of the base station controlling the neighboring cell, and does not belong to at least one PCI group not corresponding to the base station type of the base station controlling the neighboring cell.

For example, the base station type of the base station controlling the neighboring cell is a macro base station, and at least one base station type does not correspond to the base station controlling the neighboring cell is a home base station; or, the base station type of the base station controlling the neighboring cell is a home base station, and at least one base station type does not correspond to the base station controlling the neighboring cell is a macro base station.

Specifically, when the base station type of the base station controlling the neighboring cell is the macro base station, the PCI is any value from 0 to 412; when the base station type of the base station controlling the neighboring cell is the home base station, the PCI is any value from 413 to 511.

Specifically, in this embodiment, all the PCIs which are available for allocation may be divided into at least two groups, each group corresponds to different base station types, and then, a PCI in a PCI group corresponding to the base station type of the base station controlling the neighboring cell of the serving cell is allocated to the neighboring cell of the serving cell.

For example, the number of PCIs which are available to be allocated is 512, and the number of PCI groups is two, where one PCI group corresponds to the macro base station and the other PCI group corresponds to the home base station and, where, the PCI in the PCI group corresponding to the macro base station ranges from 0 to 412, and the PCI in the PCI group corresponding to the home base station ranges from 413 to 511. Thereby, if the base station type of the base station controlling the neighboring cell is a macro base station, the PCI allocated to the neighboring cell is within the range of 0~412; if the base station type of the base station controlling the neighboring cell is a home base station, the PCI allocated to the neighboring cell is within the range of 413~511.

It should be understand that the UE may obtain the base station type of the base station controlling the neighboring cell through the ANR process.

Additionally, the UE may allocate different PCIs to different neighboring cells. For example, the base station type of both a first neighboring cell and a second neighboring cell is a macro base station, the PCI allocated to the first neighboring cell may be 0, and the PCI allocated to the second neighboring cell may be 1, so as to ensure the PCIs of each cell do not conflict.

Furthermore, the allocated PCI may be represented by a primary synchronization sequence and a secondary synchronization sequence. For example, the secondary synchronization sequence has 168 groups, where each group includes 3 cells, and each cell is represented by the primary synchronization sequence. Certainly, this example may represent 168×3=504 PCIs, besides, the primary synchronization sequence and/or the secondary synchronization sequence may be extended to represent the foregoing 512 PCIs, e.g., the secondary synchronization sequence is divided into 171 groups to represent 512 PCIs. It should be understand that when the number of PCIs to be represented varies, other extension solutions may be adopted.

Step 23: transmitting, by the terminal, a PCI of the neighboring cell to a network device, so that the network device determines the base station type according to the information indicating the base station type.

For example, the network side may be an evolved base station (eNodeB, eNB).

Corresponding to the UE side, the eNB may configure the corresponding relationship between a PCI group and a base station type, and then determine the base station type according to the PCI group to which the received PCI belongs. For example, if a PCI received by an eNB is 1, which belongs to a PCI group ranging from 0 to 412, since the base station type corresponding to the PCI group ranging from 0 to 412 is a macro base station, it may be determined that the base station type is a macro base station.

Further, the base station may determine a base station identity according to the base station type. For example, a UE transmits the base station identity carried in a 28-bits ECGI to an eNB, after the eNB receives the ECGI, the eNB acquires the base station identity from the ECGI according to the base station type since the base station type has been determined. For example, when the base station type is a macro base station, first 20 bits of the cell global identity are the base station identity; when the base station type is a home base station, 28 bits of the cell global identity are the base station identity.

According to this embodiment of the present invention, different base station types correspond to different PCI groups, therefore, the network side may determine an base station type according to a PCI and, thus, recognize the base station type accurately.

Figure 3:
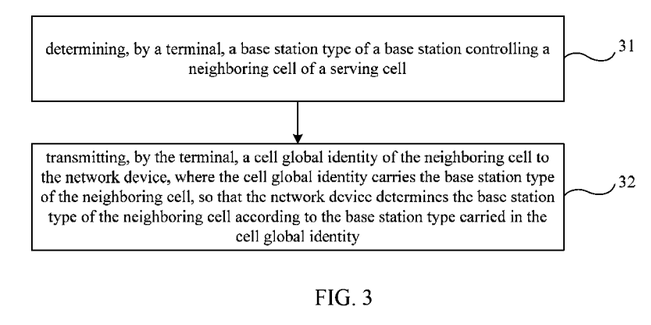
FIG. 3 is a schematic flow chart of a transmitting method according to another embodiment of the present invention.

FIG. 3 is a schematic flow chart of a transmitting method according to another embodiment of the present invention. The method includes:

Step 31: determining, by a terminal, a base station type of a base station controlling a neighboring cell of a serving cell;

For example, reference may be made to the description about Step 11.

Step 32: transmitting, by the terminal, a cell global identity of the neighboring cell to the network device, where the cell global identity carries the base station type of the neighboring cell, so that the network device determines the base station type of the neighboring cell according to the base station type carried in the cell global identity.

For example, the cell global identity occupies 32 bits, and the base station type occupies first 4 bits of the cell global identity.

Further, the cell global identity may also carry a base station identity. For example, the cell global identity is an ECGI. Compared with the existing ECGI, in the ECGI according to this embodiment, bits used for identifying the base station type are needed to be added. Assuming that the number of bits used for identifying the eNB type is 4, the ECGI according to this embodiment occupies 32 bits. When the base station type of the base station controlling the neighbor cell is a macro base station, the base station identity occupies first 20 bits following the base station type of the cell global identity; when the base station type of the base station controlling the neighboring cell is a home base station, the base station identity occupies first 28 bits following the base station type of the cell global identity.

After receiving the ECGI, the eNB may determine the base station type according to the bits used for identifying the base station type firstly.

Specifically, in existing solutions, the EGCI of the macro base station occupies 28 bits, which includes a base station identity (eNB Id) and a cell identity (Cell Id), that is, for the macro base station, the EGCI occupies 28 bits=eNB Id (20 bits)+Cell Id (8 bits). For the home base station, the EGCI occupies 28 bits, which merely includes a base station identity (eNB Id), instead of including a cell identity (Cell Id), that is, as for the home base station, the EGCI occupies 28 bits=eNB Id (28 bits).

In this embodiment, the EGCI may occupy 32 bits, compared with the existing solutions, 4 bits used for identifying the base station type (eNB Type) are added. In particular, for the macro base station, the EGCI occupies 32 bits=eNB Type (4 bits)+eNB Id (20 bits)+Cell Id (8 bits); for the home base station, the EGCI occupies 32 bits=eNB Type (4 bits)+eNB Id (28 bits).

The eNB Type (eNB Type) may be represented as follow: for example, "0" is used to represent the macro base station, "1" is used to represents the home base station, and the remaining 3 bits may be retained. The eNB may extract first 4 bits from the EGCI, if the first 4 bits are 0, it is determined that the base station type is a macro base station, and if the first 4 bits are 1, it is determined that the base station type is a home base station.

Further, a network device may acquire a base station identity from an ECGI according to the base station type, for example, when the base station type is a macro base station, the network device read the base station identity from first 20 bits following 4-bits base station type of the EGCI; when the eNB type is a home base station, the network device read the base station identity from first 28 bits following 4-bits base station type of the EGCI.

In this embodiment, through an extension of the cell global identity, a base station type may be carried in the cell global identity, therefore, the network side is enabled to determine the base station type and, thus, an accurate recognition of the base station type is realized.

Figure 4:
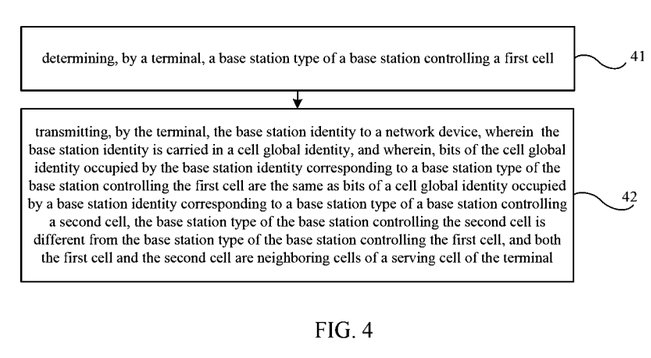
FIG. 4 is a schematic flow chart of a transmitting method according to another embodiment of the present invention.

FIG. 4 is a schematic flow chart of a transmitting method according to another embodiment of the present invention. The method includes:

Step 41: determining, by a terminal, a base station type of a base station controlling a first cell.

For example, reference may be made to the related description about Step 11.

Step 42: transmitting, by the terminal, the base station identity to a network device, wherein the base station identity is carried in a cell global identity, and wherein, bits of the cell global identity occupied by the base station identity corresponding to a base station type of the base station controlling the first cell are the same as bits of a cell global identity occupied by a base station identity corresponding to a base station type of a base station controlling a second cell, the base station type of the base station controlling the second cell is different from the base station type of the base station controlling the first cell, and both the first cell and the second cell are neighboring cells of a serving cell of the terminal.

For example, the bits refer to first 20 bits.

Further, when the base station type is a home base station, last 8 bits of the cell global identity are all 1.

Specifically, the cell global identity may be an EGCI. In the prior art, the base station identity of a macro base station occupies first 20 bits of the EGCI, the base station identity of a home base station occupies the integral 28 bits of the ECGI.

In this embodiment, no matter the base station identity is a base station identity of a macro base station or a base station identity of a home base station, the same bits of an EGCI are occupied, e.g., the first 20 bits of the EGCI are occupied. In At this time, no matter which base station type the base station identity is, the network device extracts the first 20 bits from the EGCI as the base station identity.

Further, since the base station identity of the home base station only occupies first 20 bits of the EGCI, compared with the existing solutions, 8 bits of the EGCI are remained, and the remained 8 bits may be filled with a preset value, e.g., all of the remained 8 bits are filled with 1.

According to this embodiment of the present invention, the terminal transmits the base station type to the network device, where different base station types occupy the same bits of the base station identity, therefore, the accurate recognition of the base station type is realized.

The above three embodiments are processes described based on a terminal side, as for a network side, the following processes may be provided. It should be noted that in embodiments of the present invention, for example, embodiments as shown in FIG. 3 and FIG. 4, EGCI (evolved universal terrestrial radio access network global cell identity) is mentioned, and could be understood with a definition the same as ECGI in embodiments of the present invention.

Figure 5:
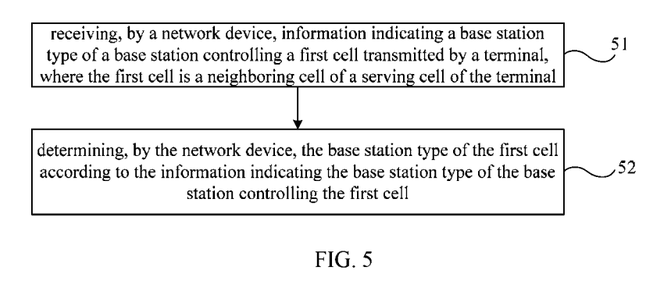
FIG. 5 is a schematic flow chart of a receiving method according to an embodiment of the present invention.

FIG. 5 is a schematic flow chart of a receiving method according to an embodiment of the present invention. The method includes:

Step 51: receiving, by a network device, information indicating a base station type of a base station controlling a first cell transmitted by a terminal, where the first cell is a neighboring cell of a serving cell of the terminal;

Step 52: determining, by the network device, the base station type of the first cell according to the information indicating the base station type of the base station controlling the first cell.

For example, the information indicating the base station type of the base station controlling the first cell is a PCI, where, the PCI belongs to a PCI group corresponding to the base station type of the base station controlling the first cell, thereby the network device determines the base station type of the base station controlling the first cell according to the PCI group to which the PCI belongs.

Specifically, a PCI in a PCI group corresponding to a macro base station ranges from 0 to 412, and the determining, by the network device, the base station type of the base station controlling the first cell according to the PCI group to which the PCI belongs comprises: if the PCI is within the range of 0~412, determining, by the network device, that the base station type of the base station controlling the first cell is the macro base station; or, a PCI in a PCI group corresponding to a home base station ranges from 413 to 511, and the determining, by the network device, the base station type of the base station controlling the first cell according to the PCI group to which the PCI belongs comprises: if the PCI is within the range of 413~511, determining, by the network device, that the base station type of the base station controlling the first cell is the home base station.

At this time, the method may further include: acquiring, by the network device, a base station identity of the base station controlling the first cell from a received cell global identity of the first cell according to the base station type. Specifically, the method may include: receiving, by the network device, the cell global identity of the first cell transmitted by the terminal, where the cell global identity carries the base station identity; and when the base station type of the base station controlling the first cell is a macro base station, reading, by the network device, first 20 bits of the received cell global identity, where the first 20 bits are the base station identity of the base station controlling the first cell; or, when the base station type of the base station controlling the first cell is a home base station, reading, by the network device, first 28 bits of the received cell global identity of the cell, wherein the first 28 bits are the base station identity of the base station controlling the first cell.

For another example, the information indicating the base station type of the base station controlling the first cell is a base station type carried in a cell global identity, thereby a network device determines the base station type of the neighboring cell from the cell global identity. For example, the cell global identity occupies 32 bits, and the base station type occupies first 4 bits of the cell global identity.

In this case, the above Step 51 may specifically include: receiving, by the network device, the cell global identity of the first cell transmitted by the terminal, wherein the cell global identity carries the base station type and the base station identity; the method of this embodiment may further include: acquiring, by the network device, a base station identity of the base station controlling the first cell from a received cell global identity of the first cell according to the base station type. Specifically, when the base station type of the base station controlling the first cell is a macro base station, reading, by the network device, first 20 bits following the base station type of the received cell global identity, where the first 20 bits following the base station type are the base station identity of the base station controlling the first cell; or, when the base station type of the base station controlling the first cell is a home base station, reading, by the network device, first 28 bits following the base station type of the received cell global identity, where the first 28 bits following the base station type are the base station identity of the base station controlling the first cell.

According to this embodiment of the present invention, the terminal transmits information indicating the base station type to the network device, therefore, the network side is enabled to determine the base station type and, thus, the accurate recognition of the base station type is realized.

Figure 6:
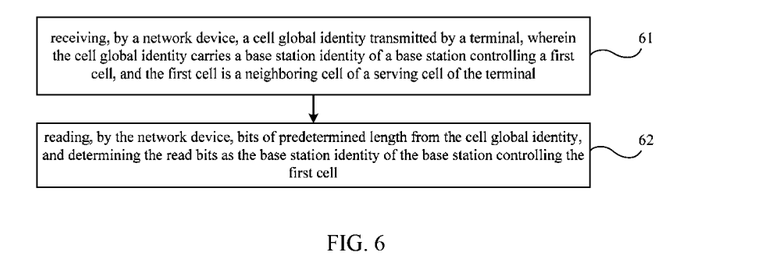
FIG. 6 is a schematic flow chart of a receiving method according to another embodiment of the present invention.

FIG. 6 is a schematic flow chart of a receiving method according to another embodiment of the present invention. The method includes:

Step 61: receiving, by a network device, a cell global identity transmitted by a terminal, wherein the cell global identity carries a base station identity of a base station controlling a first cell, and the first cell is a neighboring cell of a serving cell of the terminal;

Step 62: reading, by the network device, bits of predetermined length from the cell global identity, and determining the read bits as the base station identity of the base station controlling the first cell.

For example, when the base station controlling the first cell is a macro base station or a home base station, reading, by the network device, first 20 bits of the cell global identity, and determining the first 20 bits as the base station identity of the base station controlling the first cell.

According to this embodiment of the present invention, the terminal transmits the base station type to the network device, where different base station types occupy the same bits of the base station identity, therefore, the accurate recognition of the base station type is realized.

Figure 7:
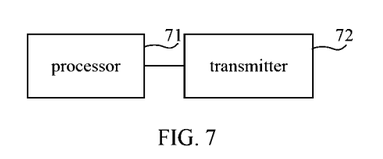
FIG. 7 is a schematic structural diagram of a transmitting device according to an embodiment of the present invention.

FIG. 7 is a schematic structural diagram of a transmitting device according to an embodiment of the present invention, where the device may be a device which executes any one of the transmitting methods according to the above FIG. 1 to FIG. 3, the transmitting device includes a processor 71 and a transmitter 72; the processor 71 is configured to determine a base station type of a base station controlling a neighboring cell of a serving cell; the transmitter 72 is configured to transmit information indicating the base station type determined by the processor to a network device, so that the network device determines the base station type according to the information indicating the base station type determined by the processor.

For example, the information indicating the base station type is PCI, the transmitter is specifically configured to: transmit a PCI of the neighboring cell to the network device; where, the PCI is allocated to the neighboring cell by the terminal, and belongs to a PCI group corresponding to the base station type of the base station controlling the neighboring cell, and does not belong to at least one PCI group not corresponding to the base station type of the base station controlling the neighboring cell.

The device may further include: a selector, configured to select a PCI from the PCI group corresponding to the base station type of the base station controlling the neighboring cell, and allocate the PCI to the neighboring cell; the transmitter 72 is specifically configured to transmit the PCI allocated by the selector to the network device.

Specifically, the base station type of the base station controlling the neighboring cell determined by the processor is a macro base station, and at least one base station type does not correspond to the base station controlling the neighboring cell is a home base station; or, the base station type of the base station controlling the neighboring cell is a home base station, and at least one base station type does not correspond to the base station controlling the neighboring cell is a macro base station.

Further, when the base station type of the base station controlling the neighboring cell determined by the processor is the macro base station, the PCI selected by the selector is any value from 0 to 412; when the base station type of the base station controlling the neighboring cell determined by the processor is the home base station, the PCI selected by the selector is any value from 413 to 511.

For another example, the information indicating the base station type is a base station type carried in a cell global identity, and the transmitter 72 is specifically configured to: transmit a cell global identity of the neighboring cell to the network device, wherein the cell global identity carries the base station type of the neighboring cell.

Specifically, the cell global identity transmitted by the transmitter 72 occupies 32 bits, the base station type occupies first 4 bits of the cell global identity.

Further, the cell global identity transmitted by the transmitter also carries a base station identity of the neighboring cell; when the base station type of the base station controlling the neighboring cell determined by the processor is the macro base station, the base station identity transmitted by the transmitter occupies first 20 bits following the base station type of the cell global identity; when the base station type of the base station controlling the neighboring cell determined by the process is the home base station, the base station identity transmitted by the transmitter occupies first 28 bits following the base station type of the cell global identity.

The above processor 71 may be further configured to take a neighboring cell of a serving cell discovered during an automatic neighbor relation detection as the neighboring cell of the serving cell.

According to this embodiment of the present invention, the terminal transmits information indicating the base station type to the network device, therefore, the network side is enabled to determine the base station type and, thus, the accurate recognition of the base station type is realized.

Figure 8:
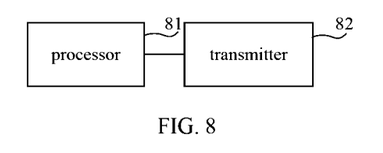
FIG. 8 is a schematic structural diagram of a transmitting device according to another embodiment of the present invention.

FIG. 8 is a schematic structural diagram of a transmitting device according to another embodiment of the present invention, the device may be a device which executes the transmitting method according to the above FIG. 4, and the transmitting device includes a processor 81 and a transmitter 82; the processor 81 is configured to determine a base station identity of a base station controlling a first cell; the transmitter 82 is configured to transmit the base station identity to a network device, where the base station identity is carried in a cell global identity, bits of the cell global identity occupied by the base station identity corresponding to a base station type of the base station controlling the first cell are the same as bits of a cell global identity occupied by the base station identity corresponding to a base station type of a base station controlling a second cell is different from the base station type of the base station controlling the first cell, and both the first cell and the second cell are neighboring cells of a serving cell of the terminal.

It may be that, in the cell global identity transmitted by the transmitter 82, bits occupied by the base station identity are first 20 bits.

Further, when the base station type is a home base station, last 8 bits of the cell global identity which is transmitted by the transmitter 82 are all 1.

According to this embodiment of the present invention, the terminal transmits the base station type to the network device, where different base station types occupy the same bits of the base station identity, therefore, the accurate recognition of the base station type is realized.

Figure 9:
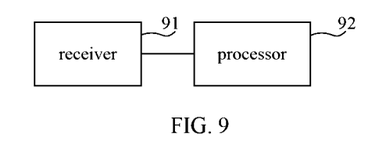
FIG. 9 is a schematic structural diagram of a receiving device according to an embodiment of the present invention.

FIG. 9 is a schematic structural diagram of a receiving device according to an embodiment of the present invention, the device may be a device executing the above FIG. 5, the receiving device includes a receiver 91 and a processor 92; the receiver 91 is configured to receive information indicating a base station type of a base station controlling a first cell transmitted by a terminal, wherein the first cell is a neighboring cell of a serving cell of the terminal; the processor 92 is configured to determine the base station type of the first cell according to the information indicating the base station type of the base station controlling the first cell received by the receiver.

It may be that, the information indicating the base station type of the base station controlling the first cell is a PCI, and the PCI belongs to a PCI group corresponding to the base station type of the base station controlling the first cell, the processor 92 is specifically configured to: determine the base station type of the base station controlling the first cell according to the PCI group to which the PCI belongs.

Specifically, a PCI in a PCI group corresponding to a macro base station ranges from 0 to 412, and the processor is specifically configured to: if the PCI is within the range of 0~412, determine that the base station type of the base station controlling the first cell is the macro base station; or, a PCI in a PCI group corresponding to a home base station ranges from 413~511, and the processor is specifically configured to: if the PCI is within the range of 413~511, determine that the base station type of the base station controlling the first cell is the home base station.

In this case, in further, the device may also include: a first recognizer, configured to acquire a base station identity of the base station controlling the first cell from a received cell global identity of the first cell according to the base station type.

Specifically, the first identifier is specifically configured to: receive the cell global identity of the first cell transmitted by the terminal, wherein the cell global identity carries the base station identity; when the base station type of the base station controlling the first cell is a macro base station, read first 20 bits of the received cell global identity, wherein the first 20 bits are the base station identity of the base station controlling the first cell; or, when the base station type of the base station controlling the first cell is a home base station, read first 28 bits of the received cell global identity of the cell, wherein the first 28 bits are the base station identity of the base station controlling the first cell.

It may also be that, the information indicating the base station type of the base station controlling the first cell received by the receiver 91 is a base station type carried in a cell global identity.

For example, the cell global identity received by the receiver 91 occupies 32 bits, and the base station type occupies first 4 bits of the cell global identity.

In this case, in further, the device may also include: a second recognizer, configured to acquire a base station identity of the base station controlling the first cell from a received cell global identity of the first cell according to the base station type.

Specifically, the receiver is specifically configured to: receive the cell global identity of the first cell transmitted by the terminal, where the cell global identity carries the base station type and the base station identity; the second recognizer is specifically configured to: when the base station type of the base station controlling the first cell is a macro base station, read first 20 bits following the base station type of the received cell global identity, where the first 20 bits following the base station type are the base station identity of the base station controlling the first cell; or, when the base station type of the base station controlling the first cell is a home base station, read first 28 bits following the base station type of the received cell global identity, where the first 28 bits following the base station type are the base station identity of the base station controlling the first cell.

According to this embodiment of the present invention, the terminal transmits information indicating the base station type to the network device, therefore, the network side is enabled to determine the base station type and, thus, the accurate recognition of the base station type is realized.

Figure 10:
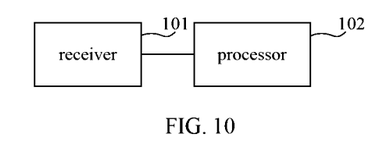
FIG. 10 is a schematic structural diagram of a receiving device according to another embodiment of the present invention.

FIG. 10 is a schematic structural diagram of a receiving device according to another embodiment of the present invention, the device may be a device executing the method of the above FIG. 6, the receiving device includes a receiver 101 and a processor 102; the receiver 101 is configured to receive a cell global identity transmitted by a terminal, wherein the cell global identity carries a base station identity of a base station controlling a first cell, and the first cell is a neighboring cell of a serving cell of the terminal; the processor 102 is configured to read bits of predetermined length from the cell global identity, and determining the read bits as the base station identity of the base station controlling the first cell.

It may be that, the processor 102 is specifically configured to: when the base station controlling the first cell is a macro base station or a home base station, read first 20 bits of the cell global identity, and determining the first 20 bits as the base station identity of the base station controlling the first cell.

According to this embodiment of the present invention, the terminal transmits the base station type to the network device, where different base station types occupy the same bits of the base station identity, therefore, the accurate recognition of the base station type is realized.

Persons skilled in the art can understand that all or a part of the steps of the methods according to embodiments of the present invention may be implemented by a program instructing relevant hardware, where, the program may be stored in a computer readable storage medium. When the program runs, the steps of the methods according to the foregoing embodiments are performed; the storage medium described above includes: the media of a read-only memory (Read-Only Memory, ROM), a random access memory (Random Access Memory, RAM), a disk, or a CD, and the like, which may store a program code.

Finally, it should be noted: the foregoing embodiments are merely used to illustrate the technical solutions of the present invention, and should not be considered as a limitation thereof; although detailed descriptions are given to the present invention with reference to the foregoing embodiments, persons of ordinary skill in the art should understand: they can still make modifications to the technical solutions recited in each individual embodiment described above, or make equivalent replacements to parts of technical features thereof; while these modifications or replacements do not make the nature of corresponding technical solutions depart from the scope of embodiments of the present invention.

What is claimed is:

1. A receiving method, comprising:
   receiving, by a network device, a first cell global identity and a second cell global identity, wherein the first cell global identity carries a base station identity of a first base station, the second cell global identity carries a base station identity of a second base station, wherein a base station type of the first base station is different from a base station type of the second base station, wherein positions of bits occupied by the base station identity of the first base station in the first cell global identity are the same as positions of bits occupied by the base station identity of the second base station in the second cell global identity, and if the base station type of the first base station or the second base station is a home base station, bits other than bits occupied by the base station identity of the home base station in the corresponding cell global identity are filled with a preset value; and
   reading, by the network device, the bits from the first cell global identity and the second cell global identity, respectively, and determining the bits, which are read from the first cell global identity, as the base station identity of the first base station, and determining the bits, which are read from the second cell global identity, as the base station identity of the second base station.

2. The method according to claim 1, wherein, the receiving, by the network device, the first cell global identity comprises:
   receiving, by the network device, the first cell global identity from a terminal, wherein a first cell is controlled by the first base station and is a neighboring cell of a serving cell of the terminal.

3. The method according to claim 2, wherein, the receiving, by the network device, the second cell global identity comprises:
   receiving, by the network device, the second cell global identity from the terminal or another terminal, wherein a second cell is controlled by the second base station and is another neighboring cell of the serving cell of the terminal.

4. The method according to claim 1, wherein, the positions of bits comprises the first 20 bits.

5. A transmitting method, comprising:
   determining, by a terminal, a base station identity of a first base station and a base station type of the first base station; and
   transmitting, by the terminal, the base station identity of the first base station to a network device, wherein the base station identity is included in a cell global identity, and wherein positions of bits occupied by the base station identity of the first base station in the cell global identity are the same as positions of bits occupied by a base station identity of a second base station in another cell global identity, if the base station type of the first base station is a home base station, bits other than bits occupied by the base station identity of the first base station in the cell global identity are filled with a preset value, wherein the base station type of the first base station is different from a base station type of the second base station, and wherein a first cell controlled by the first base station is a neighboring cell of a serving cell of the terminal.

6. The method according to claim 5, wherein neighboring cells of the serving cell of the terminal further comprise a second cell, and wherein the second cell is controlled by the second base station.

7. The method according to claim 5, wherein, the base station identity of the first base station corresponds to the base station type of the first base station, and the base station identity of the second base station corresponds to the base station type of the second base station.

8. The method according to claim 5, wherein, the positions of bits comprises the first 20 bits.

9. The method according to claim 5, wherein, when the base station type of the first base station is the home base station, the last 8 bits of the cell global identity are all 1.

10. The method according to claim 5, further comprising:
    determining, by the terminal, the base station identity of the second base station and the base station type of the second base station; and transmitting, by the terminal, the base station identity of the second base station to the network device, wherein the base station identity of the second base station is included in another cell global identity.

11. The method according to claim 5, wherein, the cell global identity is an Evolved Universal Terrestrial Radio Access Network Cell Global Identity (ECGI).

12. A transmitting device, comprising:
a processor, configured to determine a base station identity of a first base station and a base station type of the first base station; and
a transmitter, configured to transmit the base station identity of the first base station to a network device, wherein the base station identity is included in a cell global identity, and wherein positions of bits occupied by the base station identity of the first base station in the cell global identity are the same as positions of bits occupied by a base station identity of a second base station in another cell global identity, if the base station type of the first base station is a home base station, bits other than bits occupied by the base station identity of the first base station in the cell global identity are filled with a preset value, wherein the base station type of the first base station is different from a base station type of the second base station, and wherein a first cell controlled by the first base station is a neighboring cell of a serving cell of the transmitting device.

13. The device according to claim 12, wherein neighboring cells of the serving cell of the transmitting device also comprise a second cell, and wherein the second cell is controlled by the second base station.

14. The device according to claim 12, wherein the base station identity of the first base station corresponds to the base station type of the first base station, and the base station identity of the second base station corresponds to the base station type of the second base station.

15. The device according to claim 12, wherein, the positions of bits comprises the first 20 bits.

16. The device according to claim 12, wherein when the base station type of the first base station is the home base station, the last 8 bits of the cell global identity are all 1.

17. The device according to claim 12, wherein, the processor is further configured to determine the base station identity of the second base station and the base station type of the second base station; and the transmitter is further configured to transmit the base station identity of the second base station to the network device, wherein the base station identity of the second base station is included in another cell global identity.

* * * * *